United States Patent [19]
Krieger et al.

[11] 3,911,012
[45] Oct. 7, 1975

[54] METHOD OF PREPARING 4-CHLORO-DERIVATIVES OF PHENYLFORMAMIDINE AND SALTS THEREOF

[75] Inventors: Bernhard Krieger; Gerhard Hempel, both of Bergkamen-Mitte; Emanuel Kaspar, Kamen, all of Germany

[73] Assignee: Schering Aktiengesellschaft, Berlin and Bergkamen, Germany

[22] Filed: Aug. 17, 1973

[21] Appl. No.: 389,235

Related U.S. Application Data

[63] Continuation-in-part of Ser. No. 54,863, July 14, 1970, abandoned.

[52] U.S. Cl. ............................................. 260/564 RF
[51] Int. Cl.² ................................................ C07C 123/00
[58] Field of Search .................................. 260/564 RF

[56] References Cited
UNITED STATES PATENTS
3,394,397  7/1968  Duerr et al. ................. 260/564 R

OTHER PUBLICATIONS
Groggins, "Unit Processes in Organic Synthesis" (4th ed.) pp. 176–179 and 207 (1952).
Vogel, "Small Scale Preparation" (2nd ed.) pp. 253–254 (1967).

*Primary Examiner*—Gerald A. Schwartz

[57] ABSTRACT

4-Chloro-derivatives of phenylformamidines and the salts thereof are prepared by the direct chlorination of salts of the corresponding phenylformamidines.

8 Claims, No Drawings

METHOD OF PREPARING 4-CHLORO-DERIVATIVES OF PHENYLFORMAMIDINE AND SALTS THEREOF

CROSS-REFERENCE TO RELATED APPLICATION

This application is a continuation-in-part of application Ser. No. 54,863, filed July 14, 1970 now abandoned.

BACKGROUND OF THE INVENTION

The present invention relates to a novel method of preparing 4-chloro-derivatives of phenylformamidines and salts thereof by the chlorination of salts of the corresponding phenylformamidines.

It is known that N-(2-methyl-4-chlorophenyl)-formamidines and their salts are excellent agents for controlling pests of a wide variety of species, such as, for example, spinning mites and their eggs.

Heretofore, the compounds were prepared according to methods usual in the preparation of amidines by heating a corresponding aryl isocyanate or carbamic acid chloride with an N-substituted or N,N-disubstituted amide of a lower alkanoic acid.

These methods, starting from the corresponding arylamines, required the preparation of the isocyanates or carbamic acid chlorides, which is rather costly.

It is much more expeditious to prepare the aforementioned compounds according to another method by direct reaction of the corresponding arylamines with the products obtained by reacting N-substituted or N,N-disubstituted amides of lower alkanoic acids with phosphorus oxychloride.

The key substance in all these methods is an arylamine which is a 1-amino-4-chloroaryl compound, such as 2-amino-5-chlorotoluene, whose preparation requires a three-step synthesis from o-aminotoluene by way of o-acetaminotoluene which is chlorinated to 2-acetamino-5-chlorotoluene, and by subseuqent saponification to the free base. The known synthesis thus takes the following path:

GENERAL DESCRIPTION OF THE INVENTION

The object of the present invention is the provision of a more advantageous method preparing compounds of the formula

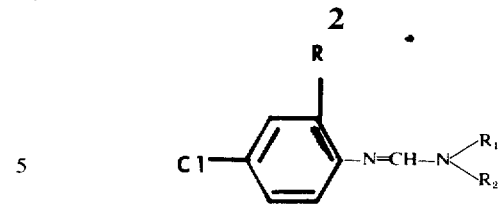

Wherein R is hydrogen or alkyl, $R_1$ and $R_2$ are each the radical of an aliphatic hydrocarbon, or $R_1$ is hydrogen and $R_2$ is the radical of an aliphatic hydrocarbon, and of salts of such compounds.

The method is characterized by reacting salts of compounds of the formula

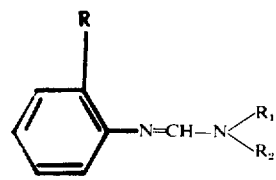

wherein R, $R_1$ and $R_2$ have the meaning described above, with chlorine or a chlorine donor in an inert solvent, and by treating the reaction product, if desired, with a base for liberating the amidine base.

Suitable aliphatic hydrocarbon radicals represented by R are lower alkyl radicals, such as methyl, ethyl and propyl. Aliphatic hydrocarbon radicals represented by $R_1$ and $R_2$ may be lower alkyl groups, such as methyl, ethyl, propyl, and the like.

Surprisingly and unexpectedly, the reaction of the invention produces hardly any by-products, such as 3-, 5- or 6-chloro derivatives of dichloro derivatives, but instead the desired 4-chloro derivatives are produced almost exclusively, with the yield of the desired product increasing with increasing strength of the acid employed for salt formation, which is also unexpected. The method of the present invention is therefore chemically unusual. The products, it is to be noted, are obtained in good yield and purity.

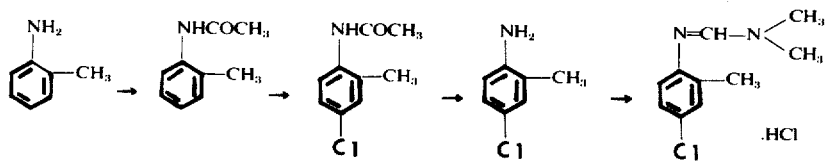

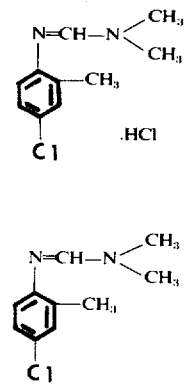

The method according to the invention permits the aforementioned products to be prepared without the numerous stages required, for example, in forming 2-amino-5-chlorotoluene, and is therefore simpler and substantially less costly. It is an additional advantage of the method of the present invention that the chlorination may be performed continuously.

The starting materials employed in the method of the invention are the corresponding salts of phenylformamidines or their alkyl derivatives, which are obtained, for example, by the reaction of an N-substituted or N,N-disubstituted amide of a lower alkanoic acid with equivalent amounts of phosphorus oxychloride in the optional presence or organic solvents at a temperature between about 20° and about 100°C, and the subsequent addition of a stoichiometrically equivalent amount of 2-aminotoluene or the like.

As indicated previously, the starting materials for the direct chlorination in the 4-position are the salts of the corresponding phenylformamidines, and particularly the acid addition salts. When the free bases are available, the desired acid addition salts are prepared in a known manner by reaction with the corresponding acids.

Acids suitable for addition salt formation are inorganic acids, such as, for example, hydrochloric acid, sulfuric acid, nitric acid, perchloric acid, phosphoric acid, and others.

The following listing shows a comparison between the physical constants of typical free bases, and the corresponding acid salts:

| | | |
|---|---|---|
| 1. | N,N-Dimethyl-N'-(2-methylphenyl)-formamidine (free base) | B.P. 79°C at 15 torr. |
| 2. | N,N-Diethyl-N'-(2-methylphenyl)-formamidine (free base) | B.P. 100°C at 0.6 torr. |
| 3. | N,N-Dimethyl-N'-phenyl formamidine hydrochloride | M.P. 210°–213°C |
| 4. | N,N-Dimethyl-N'-(2-methylphenyl)-formamidine hydrochloride | M.P. 216.5°–217.5°C |
| 5. | N,N-Dimethyl-N'-(2-methylphenyl)-formamidine perchlorate | M.P. 97°–99°C |

The preferred chlorinating agent is chlorine gas. It does not have to meet particular requirements as to its purity.

Instead of elemental or molecular chlorine, there may be employed a chlorine donor, such as hypochlorous acid, or N-chlorine compounds, as well as all substances which are precursors of hypochlorous acid, such as the salts of the acid, and tert-butyl hypochlorite, or other esters. A typical salt is sodium hypochlorite.

In U.S. Pat. No. 3,394,397 there is disclosed a process for the direct bromination of phenylformamidine compounds, wherein the free formamidine base is treated with elemental bromine in an organic solvent. This approach results in comparatively low yields of 4-bromo-derivatives, of the order of 60% of theory. In contrast thereto, the novel method of the present invention, employing the acid addition salts of the phenylformamidines as the starting material, provides yields of 95% to 100% of the theoretical, as shown by the illustrative examples given below. Thus, the use of acid addition salts of phenylformamidines, in accordance with the invention, as starting materials for the chlorination step, constitutes a critical factor of the process of the present invention.

The surprising and unexpected advantage of performing the chlorination on the acid addition salt of the phenylformamidine, rather than on the free base, in accordance with the invention, is shown by the following comparative test:

a. In order to prepare N,N-dimethyl-N'-(2-methyl-4-chloro)formamidine from the free unchlorinated base, there was formed a suspension of 81.1 g (approximately 0.5 mol) of the phenylformamidine base in 40 ml water with stirring, and 37.5 g chlorine gas (105% of theory) was introduced while stirring, at a temperature of 20°–23°C. Thereafter the reaction mixture was made alkaline with NaOH solution at a pH of 9, and the chlorinated base was extracted with methylene chloride. The methylene chloride solution was then washed with water, dried with sodium sulfate, and evaporated in vacuo. There resulted an oily residue having a content of N,N-dimethyl-N'-(2-methyl-4-chlorophenyl)-formamidine corresponding to a yield of 40.7% of theory. The balance of the oily product analyzed 19.7% unconverted phenylformamidine base, 14.7% of 4,6-dichloro derivative, remainder of unknown composition.

b. in order to prepare the 4-chloro derivative starting from the hydrochloride of the base, 81.5 g (0.5 mol) of the N,N-dimethyl-N'-(2-methylphenyl)-formamidine base together with 50 ml water was treated with 50 ml hydrochloric acid, with stirring and under nitrogen, at 20°–30°C. Into the resulting solution there was introduced with stirring at 20°C, 37.5 g of chlorine gas (105% of theory). Thereafter the mixture was made alkaline to pH 9 with NaOH, and the chlorinated base was extracted with methylene chloride. The methylene chloride solution was then washed with water, dried with sodium sulfate, and evporated in vacuo. There resulted an oily residue which contained an amount of 4-chloro-derivative corresponding to 87% of theory. The residue contained only 1.98% of unconverted base, the remainder being products of unknown composition, and a very small amount of 4,6-dichloro-derivative.

The termination of the chlorination reaction is readily recognizable by the escape of unreacted chlorine. However, even a substantial excess of applied chlorine is not of consequence since the reaction is specific, as mentioned above.

A second critical factor in performing the chlorination method of the present invention is that the chlorination must be carried out in acidic medium. Thus, while the reaction of the invention is preferably performed in aqueous solution, the aqueous medium must contain an excess of acid over the amidine base, as illustrated in the examples given below. However, the reaction may also be carried out in inert organic solvents, such as alcohols or glacial acetic acid. Here also the medium must be acid, but in each instance, the acidity should not be sufficient to cause hydrolysis of the amidine salt used as the starting material. It is also possible to perform the chlorination with the acid addition salt of the formamidine in emulsion form by the use of suitable emulsifiers.

The chlorination reaction is preferably carried out at temperatures between 0° and 50°C. Chlorination at higher or lower temperatures, however, also produces good results. It is advantageous to conduct the chlorination in the presence of a catalytic amount of a chlorination catalyst effective for this type of chlorination, such as a metal halide, for example ferric chloride.

The primary reaction products are the salts of the corresponding 4-chloro-derivative bases. The reaction mixtures may be worked up in conventional manner by evaporating the solvent or recovering the precipitated salt by filtration. If desired, the free amidine bases may be formed from the salt in conventional manner, such as by the addition of alkalis, such as sodium or potassium hydroxide or the like until a pH of about 9 is reached. It is to be noted that the bases may be purified by distillation.

The N-(4-chlorophenyl)-formamidines and their alkyl derivatives and salts as obtained according to the invention are usually colorless crystalline or oily substances.

The 4-chloro-derivaties may be used, as mentioned hereinabove, for combating pests of various kinds. Some of the compounds prepared by the method of the invention and their physical constants are listed below:

| (a) | N,N-Dimethyl-N'-(2-methyl-4-chlorophenyl)-formamidine | B.P. 98°C at 0.08 torr. |
| --- | --- | --- |
| (c) | N,N-Diethyl-N'-(2-methyl-4-chlorophenyl)-formamidine | B.P. 120°C at 0.4 torr. |
| (c) | N,N-Dimethyl-N'-(2-methyl-4-chlorophenyl)-formamidine perchlorate | M.P. 189.5°-192°C |
| (d) | N,N-Dimethyl-N'-(4-chlorophenyl)-formamidine | B.P. 101°-103°C at 0.06 mm Hg |

DESCRIPTION OF THE PREFERRED EMBODIMENTS

The following examples serve to illustrate the practice of the present invention, but are not to be considered as limiting.

Example 1

195 g of N,N-dimethyl-N'-(2-methylphenyl)-formamidine (1) and 120 ml water were mixed with 120 ml of concentrated hydrochloric acid at 20°–30°C with stirring under a nitrogen blanket. 94 g of chlorine gas were fed to this solution over a period of 2 hours at 20°C with vigorous stirring. The excess chlorine gas was then stripped with nitrogen, and about 400 ml 20% sodium hydroxide solution were added, whereby the pH was adjusted to about 9. The precipitated oily base was extracted with 150 ml ethylene chloride. The organic phase was washed twice with 50 ml water until neutral, dried over sodium sulfate, and distilled in a vacuum. N,N-dimethyl-N'-(2-methyl-4-chlorophenyl)-formamidine (2) was obtained as a fraction boiling at 98°C at 0.08 mm Hg. The formamidine crystallizes at ambient temperature and has a melting point of 29° – 30°C.

Example 2

25 g of N,N-dimethyl-N'-(2-methylphenyl)-formamidine were dissolved at 5°C in 150 ml 70% perchloric acid. 12.4 g chlorine were introduced into the solution over a period of four hours. The N,N-dimethyl-N'-(2-methyl-4-chlorophenyl)-formamidine was precipitated in the form of its perchlorate. The yield was 43.7 g = 95.6% of theoretical value, M.P. 189.5° – 192°C.

27 grams of the perchlorate, thus prepared, were dispersed in 200 ml water and 200 ml ethylene chloride, and the mixture was adjusted to pH 9 at 5°C with sodium hdyroxide. The organic phase was recovered, washed with water, dried over sodium sulfate, filtered and evaporated to dryness. There were obtained 17.8 g N,N-dimethyl-N'-(2-methyl-4-chlorophenyl)-formamidine, 100% of theoretical yield. As analyzed by gas chromatography, the compound contained only 2% of the 6-chloro-isomer. When stored in a refrigerator, the crude product crystallized and had a melting point of 28° to 29°C.

Example 3

195 g N,N-dimethyl-N'-(2-methylphenyl)-formamidine were dissolved in dilute sulfuric acid instead of hydrochloric acid and reacted with chlorine in a procedure analogous to that of Example 1. When the reaction mixture was worked up, the N,N-dimethyl-N'-(2-methyl-4-chlorophenyl)-formamidine of B.P. 98°C was obtained by distillation at 0.08 Torricelli.

Example 4

32.4 g of N,N-dimethyl-N'-(2-methylphenyl)-formamidine were dissolved in 10 ml water and 20 ml concentrated hydrochloric acid, and 24 g tert-butyl hypochlorite were added at 5°C within 2 hours. The reaction mixture was worked up to the base by a procedure analogous to Example 1. The N,N-dimethyl-N'-(2-methyl-4-chlorophenyl)-formamidine was obtained by distillation at 0.08 Torricelli at a boiling point of 98°C.

Example 5

50 g N,N-dimethyl-N'-(2-methylphenyl)-formamidine were chlorinated by the procedure of Example 1, but in the presence of 0.5 g ferric chloride. The N,N-dimethyl-N'-(2-methyl-4-chlorphenyl)-formamidine was obtained by distillation at 0.08 Torricelli at 98°C.

Example 6

50 g N,N-dimethyl-N'-(2-methylphenyl)-formamidine hydrochloride were dissolved in 160 ml methanol, and 25 g chlorine were introduced at 5°C over 4 hours. A pH of 9 was set by means of sodium hydroxide, 210 ml ethylene chloride were added, and the organic phase was washed with water until neutral, then dried with sodium sulfate, filtered and evporated to dryness. The yield was 46 g equal to 92.5% of theoretical yield. The N,N-dimethyl-N'-(2-methyl-4-chlorophenyl)-formamidine was recovered by distillation at 0.08 Torricelli and 98°C.

Example 7

50 g N,N-dimethyl-N'-(2-methylphenyl)-formamidine hydrochloride were dissolved in 110 ml glacial acetic acid, and 26.3 g chlorine were introduced at 5°C over a period of 4 hours, 2.2 g chlorine remaining unreacted. The pH was adjusted to 9 with sodium hydroxie and the solution was extracted with ethylene chloride. The organic phase was washed with water until neutral, dried over sodium sulfate, filtered and evaporated to dryness in a vacuum. The yield was 50.3 g. The N,N-dimethyl-N'-(2-methyl-4-chlorophenyl)-formamidine was recovered by distillation at 0.08 Torricelli and 98°C.

Example 8

N,N-dimethyl-N'-phenyl-formamidine hydrochloride of M.P. 210°–213°C was prepared in a conventional manner from aniline, dimethylformamide, and phosphorus oxychloride.

250 g of the hydrochloride were dissolved in 300 ml water, and then chlorinated and further processed as in Example 1. Distillation at 0.06 Torricelli and 101°-103°C yielded the N,N-dimethyl-N'-4-chlorophenyl-formamidine.

Example 9

N,N-diethyl-N'-(2-methylphenyl)-formamidine was prepared from o-toluidine, diethylformamide, and phosphorus oxychloride in a conventional manner. It was purified by distillation at 0.6 Torricelli and 100°C.

38 g of the above formamidine were dissolved in 38 ml water by addition of 23 ml concentrated hydrochloric acid, and then chlorinated and further worked up as described in Example 1. N,N-diethyl-N'-(2-methyl-4-chlorophenyl)-formamidine distilled over at 0.4 Torricelli and 120°C.

Example 10

99.4 g N,N-dimethyl-N'-(2-methylphenyl)-formamidine hydrochloride were dissolved in 100 ml water, and 20 ml concentrated hydrochloric acid were added, whereby the pH was adjusted to 0. 39.2 g chlorine gas were introduced into this solution at −10°C within 2.5 hours with vigorous agitation. After the chlorine supply had been interrupted, stirring at −10°C was continued for 2 hours. Thereafter, 100 ml benzene were added, and the mixture was heated to its boiling point under a reflux condenser equipped with a water trap until practically the entire water was removed, whereby the reaction product was precipitated in crystalline form. 100 ml isopropanol were added, and 30 ml of a mixture of benzene and isopropanol was distilled off to remove any residual water. Upon cooling, the mixture was stirred for an additional hour at 20°C. The crystalline precipitate was recovered by suction filtration, washed twice with 15 ml isopropanol and dried at 60°C in a vacuum. Yield: 94 g (94.5%) N,N-dimethyl-N'-(2-methyl-4-chlorophenyl)-formamidine hydrochloride of M.P. 218° − 220.5°C.

What is claimed is:

1. A method for the preparation of 4-chloro- derivatives of a phenylformamidine of the formula

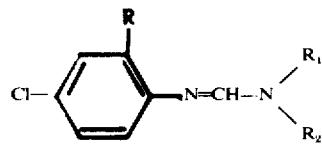

wherein R is hydrogen or lower alkyl, $R_1$ is hydrogen or lower alkyl, and $R_2$ is lower alkyl, which comprises chlorinating an acid addition salt of a n inorganic acid of said phenylformamidine with a chlorinating agent selected from the group consisting of chlorine gas and a chlorine donor, at a temperature between about 0° and 50° C. in an acidic liquid medium.

2. The method of claim 1 in which R, $R_1$ and $R_2$ are methyl.

3. The method of claim 1 in which said acid addition salt is the hydrochloride.

4. The method of claim 1 in which the chlorination is performed in the presence of a catalytic amount of a metal halide catalyst for said chlorination.

5. The method of claim 4 in which said catalyst is ferric chloride.

6. The method of claim 1 in which the addition salt is a perchlorate.

7. The method of claim 1 in which the chlorination is performed with elemental chlorine.

8. The method of claim 1 in which the chlorinating agent is hypochlorous acid.

* * * * *